Feb. 12, 1963  V. S. JUENKE  3,077,124
TWO-SPEED DRIVE MECHANISM
Filed Aug. 11, 1960
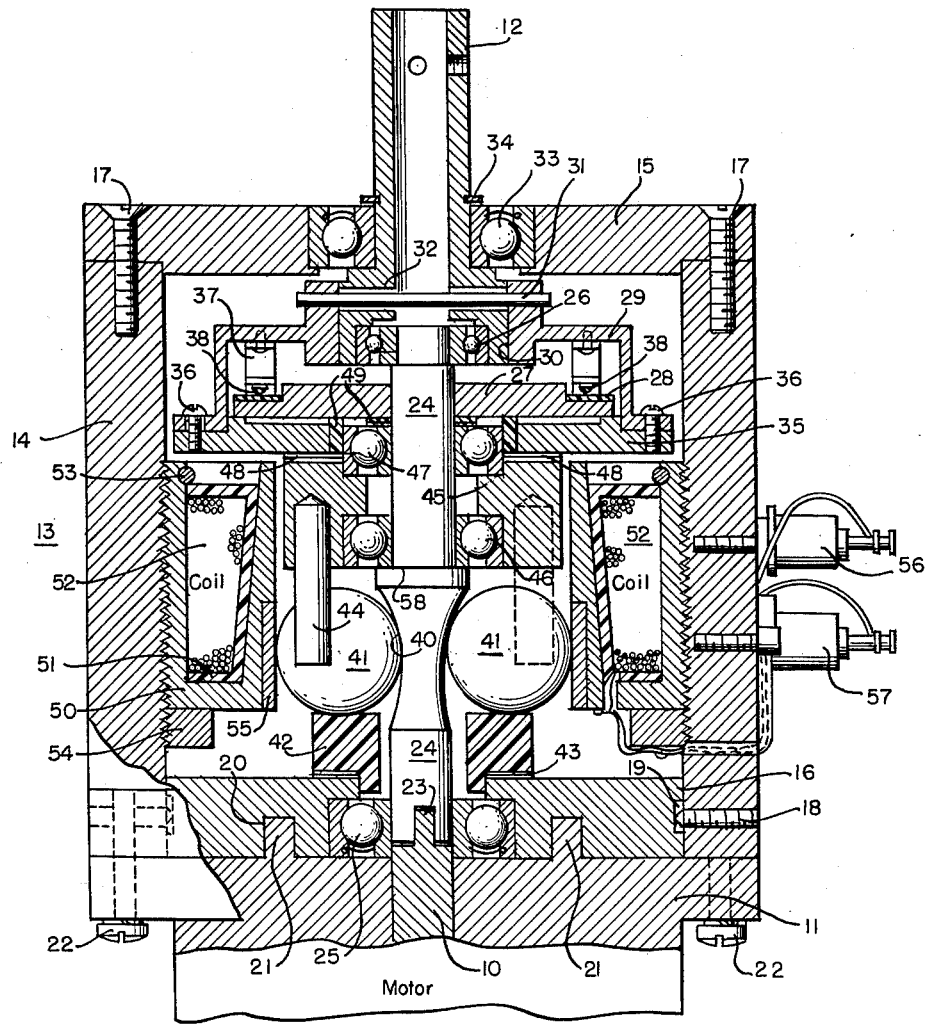
INVENTOR
Vern S. Juenke
BY Moore & Hall
ATTORNEYS 3,077,124
TWO-SPEED DRIVE MECHANISM
Vern S. Juenke, Reno, Nev., assignor to Nevada Air
Products Company, Reno, Nev.
Filed Aug. 11, 1960, Ser. No. 48,917
8 Claims. (Cl. 74—772)

The present invention is concerned with drive mechanisms adapted to effect driving engagements between a drive shaft and a driven shaft, which driving engagements may be varied as desired to alter the output speed of the driven shaft for a given speed of the drive shaft; and is more particularly concerned with an improved drive arrangement of the general type described, which exhibits improved operation and which solves a number of problems present heretofore in prior multi-speed drive mechanisms.

As is well known, it is often desired to provide a drive mechanism adapted to effect a speed change between a driving and driven shaft; and it is further often desired to provide such a mechanism wherein the speeds of said driven shaft may be changed from one to another speed, depending upon certain requirements of the entire system. Some examples of such systems, with which the present invention may be employed with great effectiveness, include motor driven tuning networks for use in various radio transmitter and electronic equipments, antenna drive systems adapted to effect direction control of an antenna, tape recording systems, and various homing devices. In such arrangements, and indeed in other arrangements known to those skilled in the art, it is often desired to provide a drive which has both a coarse and fine control, in that the system should be able to operate quickly to position a driven shaft to an approximation of a final desired position, whereafter a slower speed, vernier, or fine adjustment may thereafter be desired to move the output shaft to some final position.

Arrangements of the types suggested heretofore, adapted to effect such operation, have normally taken the form of gearing arrangements wherein gear ratios may be changed to provide desired ratios of speed control; and in some instances such gearing arrangements have been associated with centrifugal type shifts to effect the desired speed change. Gearing arrangements of these general types have been found to exhibit considerable wear during operation whereby continued good operation of the system imposes severe maintenance problems on the device. These prior systems have, moreover, been essentially mechanical in nature whereby they do not lend themselves to remote control. In addition, the systems suggested heretofore have been such that short speed change times have not been possible; and indeed have been such that the motor employed for input drive might have to actually be stopped in order to index between desired speed ratios. Such problems of speed of operation, wear and maintenance, noise, and remote control, can be considered serious defects in a truly efficient system; and the arrangement of the present invention is designed to solve all of these problems by providing a drive mechanism of highly improved structure and operation.

It is accordingly an object of the present invention to provide an improved form of drive mechanism capable of effecting multiple output speeds, particularly too distinct speeds of rotation for an output shaft.

Another object of the present invention resides in the provision of an improved two-speed drive which is adapted to effect either of two speeds of rotation for an output shaft while the input shaft or drive shaft operates at full speed, thereby to provide a constant output r.p.m. in each selected speed ratio, with no hunting or cycling and with maximum output torque.

A further object of the present invention resides in the provision of an improved two-speed drive mechanism employing a ball planetary drive arrangement whereby the life of the system is greater and the operation of the device is less noisy than has been the case in gear type systems suggested heretofore.

Still another object of the present invention resides in the provision of a two-speed drive system of improved design so arranged that an output shaft can be stepped up or stepped down in speed without stopping the drive motor for the system.

A still further object of the present invention resides in the provision of an improved two-speed drive arrangement wherein speed changes can be effected in substantially shorter times than has been possible in centrifugal type shifts or in gearing arrangements suggested heretofore.

A still further object of the present invention resides in the provision of an improved two-speed drive arrangement employing an electrical control structure whereby the system lends itself to ready remote control.

Another object of the present invention resides in the provision of an improved two-speed drive arrangement particularly adapted for use in systems requiring a coarse and a fine directional positioning control, and further adapted for bidirectional use in such systems.

In providing for the foregoing objects and advantages, the present invention contemplates the provision of a two-speed drive arrangement taking the form of a drive shaft which is coupled to a motor, preferably adapted to rotate in either of two opposing directions, serving as the input motive source. The system further includes a driven shaft, preferably disposed substantially coaxial with the aforementioned drive shaft; and clutch means as well as a ball planetary speed reducing mechanism are disposed between the drive and driven shafts.

The clutch means and ball planetary mechanism are so arranged relative to one another that when one is engaged the other is disengaged, whereby engagement of the clutch means removes substantially all load from the ball planetary drive portion of the system and causes the driven shaft to operate at a 1:1 ratio with the drive shaft. Upon appropriate actuation of control means, the clutch means may be disengaged and the ball planetary drive portion of the system put into operation whereby the driven shaft is then caused to rotate at a slower speed corresponding to the speed reduction ratio effected by the interposition of the ball planetary speed reducing mechanism between the drive and driven shafts. The aforementioned control means, adapted to effect selection of the clutch means or the ball planetary drive portion of the system, preferably takes the form of an electrical actuator comprising an integral portion of the drive; and in a preferred arrangement such as will be described hereinafter, a movable magnetic plate is positioned between the clutch means and the ball planetary mechanism, said magnetic plate being so arranged that changes in its position determine which of said clutch and ball planetary mechanisms is actually selected for coupling drive between the drive and driven shafts. A coil, to which electrical control signals may be coupled, is also provided for causing said magnetic plate to move in one or another direction thereby to provide an electrical control for determining which of the two drive couplers is operative.

By this arrangement, therefore, speed reduction, when desired, is effected through a highly efficient ball planetary mechanism; and such a drive, as is known to those skilled in the art, exhibits substantially longer life, fewer maintenance problems, and quieter operation than is possible in gearing arrangements. Direct drive is achieved by a clutching arrangement which not only couples the drive and driven shafts to one another in non-slip engagement, but which simultaneously removes load from the ball planetary drive portion of the system thereby substantially increasing the life of the overall system. Moreover, the operation of the system is electrically controlled, whereby shifts in speed can be quickly achieved, and by remote control when desired.

The foregoing objects, advantages, construction and operation of the present invention will become more readily apparent from the following description, taken in light of the accompanying drawing, which shows, in partial section, a preferred embodiment of a two-speed drive arrangement constructed in accordance with the present invention.

Referring now to the drawing, it will be seen that, in accordance with the present invention, drive may be effected between the output shaft 10 of a motor 11 and a stainless steel driven shaft 12 by a two-speed drive arrangement generally designated 13. The drive mechanism 13 includes an aluminum alloy housing 14 provided with a front cover 15 and a rear cover 16, also made of an aluminum alloy; the front cover 15 being retained in place by recess screws 17 while the rear cover is retained in place by a plurality of set screws 18 passing through the walls of housing 14 into engagement with complementary recesses 19 in rear plate 16. Rear plate 16 also includes an annular recess 20 in the rear surface thereof adapted to engage an outstanding ring projection 21 in the forward edge of motor 11; and the motor 11 may be further attached to housing 14, and thereby to the overall drive mechanism 13 by a plurality of bolts 22.

Shaft 10 of motor 11 includes a tongue 23 adapted to engage a complementary recess in the adjacent end of a hardened steel drive shaft 24 located within housing 14. The rear plate 16 of the housing further includes a ball bearing structure 25 pressed therein for supporting the lower end (as depicted) of drive shaft 24; with the upper end of said drive shaft 24 being supported by further ball bearings 26. Drive shaft 24 carries a hardened steel clutch plate 27 press fit in fixed relation thereto, with the outer periphery of the clutch plate 27 being recessed as shown to receive a nylon anti-friction washer 28. The upper surface of clutch plate 27 is enclosed by a clutch housing 29 which includes an inner cylindrical surface 30 slidably mounted on an adjacent portion of driven shaft 12; and said clutch housing 29 is retained in this slidable engagement, and within a nominal area relative to shaft 12, by a steel roll-pin 31 passing through both clutch housing 29 and through an enlarged orifice 32 provided in driven shaft 12, as illustrated.

By this arrangement of roll-pin and the enlarged orifice 32, it will be appreciated that clutch housing 29 may be slidably moved, relative to driven shaft 12, within limits. This being the essential purpose of roll-pin 31, it will further be appreciated that other structures could be provided to similar effect, e.g. a splined arrangement between clutch housing 29 and shaft 12.

The lowermost end of driven shaft 12 has the aforementioned bearing 26 press-fitted therein, and shaft 12 is in turn further supported by bearing 33 which is pressfitted into front cover 15 of housing 14, drive shaft 12 being retained in place by a steel snap ring 34.

The lower end of clutch housing 29 takes the form of an armature plate 35 comprised of magnetic material, e.g. cast iron, with said plate 35 being fastened to the remainder of clutch housing 29 by bolts 36. A plurality of beryllium copper springs 37 are also attached to the upper portion of clutch housing 29, on the interior thereof, as illustrated; with said springs including nylon buttons 38 bearing upon nylon anti-friction washer 28, discussed previously. Springs 37 are spaced from one another about the shafts 24 and 12 and are operative to normally urge clutch housing 29, and thereby magnetic plate 35, upward against fixed clutch plate 27. This upward urging of clutch housing 29 thus normally causes the lower surface of clutch plate 27 to engage the upper surface of armature plate 35, as illustrated, whereby plates 27 and 35 are in frictional engagement with one another thereby to effect a direct drive from motor shaft 10 through drive shaft 24, clutch plate 27, magnetic plate 35, housing 29 and roll-pin 31, to output shaft 12. This particular connection is, as will be appreciated from the configuration illustrated, the normal condition of operation for the structure; and functions to provide a direct drive between drive shaft 24 and driven shaft 12 thereby to cause driven shaft 12 to operate at the same speed of rotation as that of drive shaft 24 and motor shaft 10.

The system also includes a ball bearing planetary type drive mechanism which may be brought into selective operation under an electrical control. Such ball bearing planetary drives are generally known, albeit not in the particular arrangement shown in the drawings and characteristic of the present invention. In general, however, known forms of ball bearing planetary drive mechanisms ordinarily include an outer and inner race having balls mounted therebetween and cooperating with a cage or separator structure, the outer race of the bearing member being held in substantially fixed position. When drive is applied to the cage and the output is taken from the inner race, a speed increase normally equal to the outer race diameter plus the inner race diameter divided by the inner race diameter, is effected; and if drive is effected in the opposite direction, i.e. to the inner race, with the output being taken from the cage, a speed reduction of the same ratio may be achieved. This general type of operation, which is itself known, forms the basis for the ball bearing planetary speed reducing mechanism which comprises a portion of the present system.

In particular, drive shaft 24 includes an inner arcuate surface 40 which acts as an inner race for a plurality of ball members 41 which are spaced about drive shaft 24. The lower surfaces of balls 41 rest on a nylon backing race 42; and said backing race 42 is in turn seated, as shown, in a portion of rear cover 16, with a plurality of stainless steel race adjusting shims 43 being interposed between said backing race 42 and back plate 16. The several balls 41 are separated from one another by a cage comprising nylon pins 44, press-fitted into a steel low-speed plate 45. Plate 45 also receives at its lower end a bearing structure 46, and at its upper end a bearing structure 47, for supporting the cage structure comprising plate 45 and pins 44 in surrounding relation to drive shaft 24. The upper surface of low-speed plate 45 is normally separated from the lower surface of magnetic armature plate 35, comprising a portion of the aforementioned clutch housing 29; and a pair of stainless steel buffer washers 48 are interposed between plate 45 and plate 35, it being understood that these buffer washers 48 do not normally effect any driving engagement between said plates 35 and 45 when unit is in direct drive. Further washers 49 are interposed between the inside race of bearing 47 and clutch plate 27, to adjust the gap between armature 35 and plate 45.

An energizing arrangement, adapted to provide selective movement of magnetic armature plate 35, and thereby of certain other portions of the system, is provided in surrounding relation to drive shaft 24; and the particular arrangement illustrated includes a hollow magnetic cast iron core 50 thread engaging an inner threaded portion of housing 14 and containing on the interior thereof a nylon bobbin 51 having a copper wire coil 52 wound thereon. Bobbin 51 and its coil 52 is retained in place within core 50 by a brass snap ring 53; and the lower end of core 50 is also retained in place by a threaded retaining ring 54 which engages both the threaded inner surface of housing 14 and the lower surface of core 50. As thus mounted, magnet structure 50—51—52 is adjustable in position to vary the required gap between magnet core 50 and armature plate 35. The inner surface of core 50 also has press-fitted therein a hardened steel bearing race 55 which acts as the outer race for ball members 41. The opposing ends of coil 52 are coupled to terminals 56 and 57 on the exterior of housing 14 whereby current may be selectively coupled to said coil 52 for control purposes.

In operation, and in the absence of any current being applied to coil 52, direct drive is coupled from shaft 24 to shaft 12 in the manner already described. For this particular condition of operation the cage member, comprising plate 45 and its pins 44, is not in forcible engagement with balls 41; and balls 41 by the same token are in reasonable slip-engagement with race 55 whereby substantially no load is imposed on the ball planetary portions of the system.

Upon energization of the coil 52, e.g. by applying 24 volts D.C. across terminals 56—57, core 50 attracts magnetic armature plate 35 in a downward direction. This downward movement of plate 35 causes a like downward movement of clutch housing 29, whereby springs 37 are compressed, with the upper surface of armature plate 35 simultaneously being pulled away from the lower surface of clutch plate 27. The downward movement of plate 35 and clutch housing 29 further causes the lower surface of said armature plate 35 to forcibly engage the upper surface of bearing cage low-speed plate 45 through washers 48. It will be appreciated that forcible engagement is possible inasmuch as shaft 24 moves downward causing the increasing diameter of the radius at point 40 to force balls 41 into firm engagement with race 55 and due further to the fact that balls 41 cannot move downward due to the interposition of backing race 42. The downward shift of low speed plate 45 thus exerts a rearward force on the shoulder 58 of shaft 24 and causes the planetary balls 41 to exert an outward force on outer race 55 thereby causing a non-slip planetary action.

With this condition of operation, the ball planetary mechanism is brought into complete operation, with the balls 41 thereof being forcibly held between the arcuate inner bearing surface 40, backing race 42, outer race 55, and cage pins 44; outer race 55, and cage pins 44; and a step-down speed ratio is thereby achieved, with this ratio being equal to $(D+d)/d$, wherein $D$ is the inner diameter of race 55 and $d$ is the external diameter of the arcuate portion 40 of shaft 24 at the point of ball contact. In a practical embodiment of the invention, the speed reduction is in the ratio of 8.4:1; but other ratios can be achieved by using other ball diameters and matching diameters at point 40.

When the ball planetary mechanism is in operation the plates 35 and 27 are separated, as described previously, whereby direct drive is not effected. For this condition of operation, however, it will be noted that the clutch housing 29, and thereby springs 37, are caused to operate at a reduced speed, while clutch plate 27, which is fixed to shaft 24, continues to operate at the speed of motor 11; and there is therefore a differential speed between clutch plate 27 and clutch housing 29. This differential speed of rotation is particularly exhibited in the region of nylon buttons 38 comprising the lower ends of springs 37; but through the use of nylon buttons 38, and nylon washer 28, acting as differential speed bearing surfaces, no significant wear occurs.

Upon de-energization of terminals 56—57, coil 52 no longer attracts plate 35; and springs 37 then operate against fixed clutch plate 27 to move clutch housing 29 upward. This operation thereby restores the direct drive between clutch plate 27 and the upper surface of magnetic armature plate 35 and simultaneously removes the driving engagement between the lower surface of armature plate 35 and the ball planetary portion of the system. As a result, the system is automatically returned to its 1:1 ratio through simple de-energization of the coil. By this arrangement therefore the system may be caused to operate in either 1:1 or 8.4:1 (or other) ratios, through the simple expedient of energizing and de-energizing electrical terminals 56—57. Such energization may, of course, be effected by remote control in those cases where such remote control is desired; and through the use of an electrical control system, it will further be appreciated that more rapid changes of speed can be effected than by mechanical arrangements.

While I have thus described a preferred embodiment of the present invention, many variations will be suggested to those skilled in the art, and it must therefore be emphasized that the foregoing discussion is meant to be illustrative only and should not be considered limitative of my invention. All such variations and modifications as are in accord with the principles described are means to fall within the scope of the appended claims.

Having thus described my invention, I claim:

1. A multi-speed drive mechanism comprising a housing having a drive shaft adapted to be driven by a motor, a driven shaft extending from said housing, a first plate attached to said drive shaft for rotation therewith, a second plate movably attached to said driven shaft for rotation therewith, said second plate extending substantially parallel to said first plate, means normally holding said plates in frictional engagement with one another whereby rotation of said drive shaft effects rotation of said driven shaft at the same speed, a speed reducing drive mechanism comprising a stationary outer bearing race surrounding said drive shaft, said drive shaft including a portion acting as an inner bearing race, a plurality of balls located about said drive shaft between said outer race and said inner bearing race shaft portion, and a bearing cage separating said balls, said cage including a portion disposed adjacent to and spaced from said second plate, and magnetic control means for selectively moving said second plate away from said first plate and into forcible engagement with said cage portion whereby said drive shaft rotates said driven shaft through said speed reducing drive mechanism rather than through frictional engagement of said plates thereby to effect rotation of said driven shaft at a reduced rate in response to operation of said control means.

2. A multi-speed drive mechanism comprising a housing having a drive shaft adapted to be driven by a motor, a driven shaft extending from said housing, a first plate attached to said drive shaft for rotation therewith, a second plate movably attached to said driven shaft for rotation therewith, said second plate extending substantially parallel to said first plate, said second plate including portions of magnetic material, means normally holding said plates in frictional engagement with one another whereby rotation of said drive shaft effects rotation of said driven shaft at the same speed, a speed reducing drive mechanism comprising an outer bearing race surrounding said drive shaft, said drive shaft including a surface portion acting as an inner bearing race, a plurality of balls located about said drive shaft between said outer race and said surface portion of said shaft, and a bearing cage separating said balls, said cage including a portion disposed adjacent to and spaced from said second plate, and magnetic control means including an electrically energizable coil located within said housing for selectively attracting said second plate away from said first plate and into forcible engagement with said cage portion whereby said drive shaft rotates said driven shaft through said speed reducing drive mechanism rather than through frictional engagement of said plates thereby to effect rotation of said driven shaft at a reduced rate in response to operation of said control means.

3. The combination of claim 1 wherein said drive shaft portion includes an arcuate concavity acting as said inner race for said balls.

4. The combination of claim 1 wherein said first plate comprises a clutch plate, a clutch housing adjacent said clutch plate in movable engagement with said driven shaft, said second plate comprising a portion of said clutch housing, said means normally holding said plates in engagement with one another comprising resilient means within said clutch housing urging said clutch plate into engagement with said clutch housing portion.

5. The combination of claim 3 wherein said bearing cage is normally in loose engagement with said balls and said balls are normally in slip-engagement with said inner bearing race when said first and second plates are in engagement with one another thereby to remove load from said balls, said operation of said control means operating to effect a shift in the relative positions of said balls and said arcuate concavity to effect a forcible non-slip engagement between said balls and said inner race thereby to load said speed reducing drive mechanism for speed reduction.

6. The combination of claim 1 wherein said magnetic control means is electrically operable.

7. A multi-speed drive mechanism comprising a rotatable drive shaft, an arcuate surface on said drive shaft, a driven shaft disposed in spaced substantially coaxial relation to said drive shaft, a clutch plate attached to said drive shaft for rotation therewith, a magnetic plate attached to said driven shaft for rotation therewith, said clutch and magnetic plates being movable relative to one another, means for moving said clutch and magnetic plates into engagement with one another whereby rotation of said drive shaft effects rotation of said driven shaft at the same speed, a ball bearing speed reducing mechanism located adjacent said drive shaft for driving engagement therewith, said speed reducing mechanism including a plurality of balls disposed adjacent said arcuate surface in slip engagement therewith, said speed reducing mechanism further including a bearing cage spaced from said magnetic plate, and electrically responsive magnetic control means for selectively moving said magnetic plate away from said clutch plate and into forceable engagement with said bearing cage to effect movement of said arcuate surface, relative to said balls, into a forceable non-slip engagement with said balls whereby said arcuate surface acts as a race for said balls and said drive rotates said drive shaft through said speed reducing mechanism at a reduced rate of speed.

8. A drive mechanism comprising a motor driven drive shaft, a driven shaft, clutch means attached to said drive shaft, said clutch means normally engaging said driven shaft whereby rotation of said drive shaft normally effects rotation of said driven shaft at the same speed, a speed reducing drive mechanism comprising a fixed outer bearing race, an arcuate surface carried by said drive shaft and acting as an inner bearing race, a plurality of balls positioned between said outer race and said arcuate surface, said balls normally being in slip engagement with said arcuate surface, a bearing cage disposed adjacent to and normally spaced from said clutch means, and electrical control means comprising fixed magnetic field producing means for selectively disengaging said clutch means and for moving a portion of said clutch means into engagement with said cage thereby to effect relatively firm engagement between said balls and said arcuate surface so as to produce rotation of said driven shaft at a reduced rate through said speed reducing drive mechanism.

References Cited in the file of this patent
UNITED STATES PATENTS

| | | |
|---|---|---|
| 1,789,116 | Shaw et al. | Jan. 13, 1931 |
| 2,536,803 | Gleason | Jan. 2, 1951 |
| 2,659,249 | Carr | Nov. 17, 1953 |